United States Patent
Kritt et al.

(10) Patent No.: US 7,605,705 B2
(45) Date of Patent: Oct. 20, 2009

(54) METHOD AND APPARATUS FOR TRACKING OR IDENTIFYING ITEMS IN A SET

(75) Inventors: Barry Alan Kritt, Raleigh, NC (US); Thomas S. Mazzeo, Durham, NC (US); Rodney Edward Shepard, II, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 11/466,174

(22) Filed: Aug. 22, 2006

(65) Prior Publication Data

US 2008/0048862 A1    Feb. 28, 2008

(51) Int. Cl.
G08B 13/14    (2006.01)
(52) U.S. Cl. ............ 340/572.4; 340/568.6; 705/28
(58) Field of Classification Search ........ 439/138, 439/630, 137, 136, 946; 340/572.4, 572.1, 340/539.32, 568.6, 10.1, 10.4, 10.51, 5.92; 235/385; 705/28
See application file for complete search history.

(56) References Cited

U.S. PATENT DOCUMENTS

| | | | |
|---|---|---|---|
| 4,673,932 A * | 6/1987 | Ekchian et al. ........... 340/5.92 |
| 6,366,205 B1 * | 4/2002 | Sutphen .................. 340/568.6 |
| 6,608,563 B2 | 8/2003 | Weston et al. | |
| 7,034,684 B2 * | 4/2006 | Boman et al. ......... 340/539.32 |
| 7,209,041 B2 * | 4/2007 | Hines et al. ............. 340/572.4 |
| 2002/0008623 A1 * | 1/2002 | Garber et al. ........... 340/572.1 |
| 2002/0047777 A1 | 4/2002 | Casden | |
| 2002/0067263 A1 * | 6/2002 | Tafoya et al. ........... 340/572.1 |
| 2002/0070865 A1 | 6/2002 | Lancos et al. | |
| 2003/0102970 A1 * | 6/2003 | Creel et al. ............. 340/572.1 |
| 2004/0046642 A1 | 3/2004 | Becker et al. | |
| 2005/0101314 A1 | 5/2005 | Levi | |
| 2005/0258240 A1 * | 11/2005 | Chappidi et al. ............ 235/385 |
| 2006/0255918 A1 * | 11/2006 | Bernstein et al. ........ 340/568.6 |

* cited by examiner

*Primary Examiner*—Thomas J Mullen
(74) *Attorney, Agent, or Firm*—Yee & Associates, P.C.; Steven L. Bennett

(57) ABSTRACT

A computer implemented method, apparatus, and computer usable program code for determining whether a set of items is complete. An interrogate signal is transmitted from a tag reader into an interrogation zone. Each item returning a response signal to the tag reader in response to the interrogate signal is included in a checked item set. The checked item set is compared to a set data. The set data identifies all items in a set of items, the set data is included in at least one tag associated with at least one item in the set of items, and the set data is included in at least one response signal received at the tag reader. A determination is made whether the set of items is complete, wherein the set of items is complete if every item identified in the set data is included in the checked item set.

20 Claims, 5 Drawing Sheets

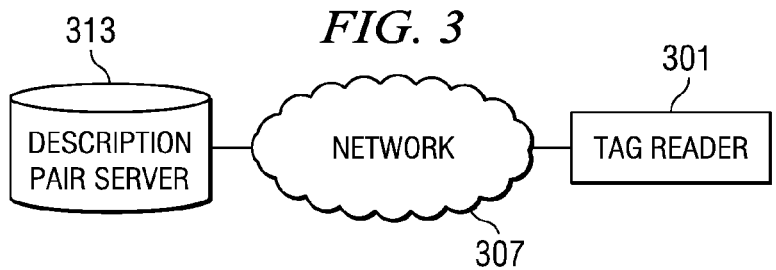
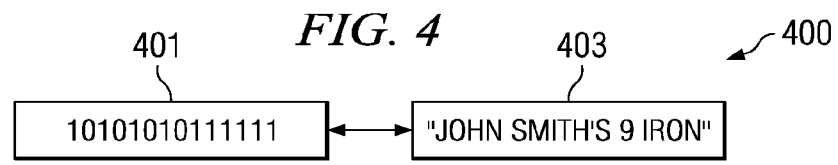
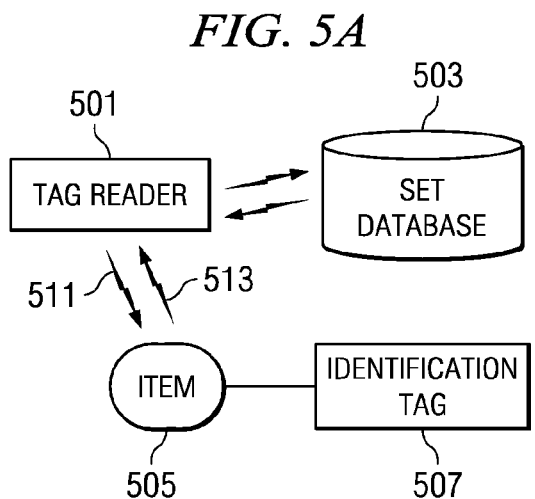
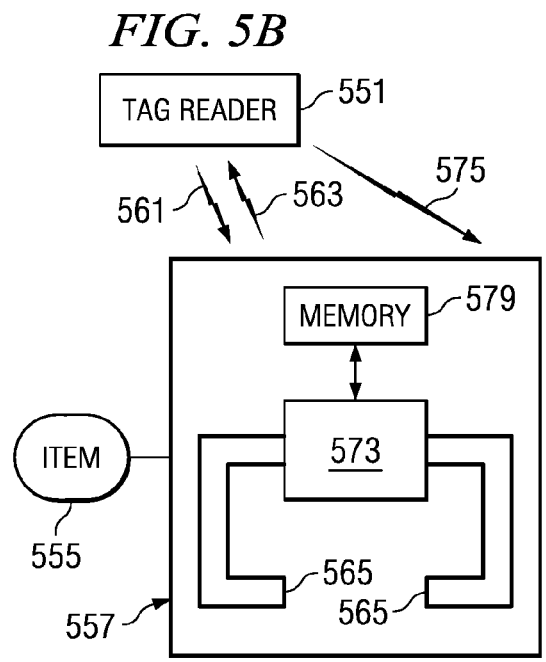

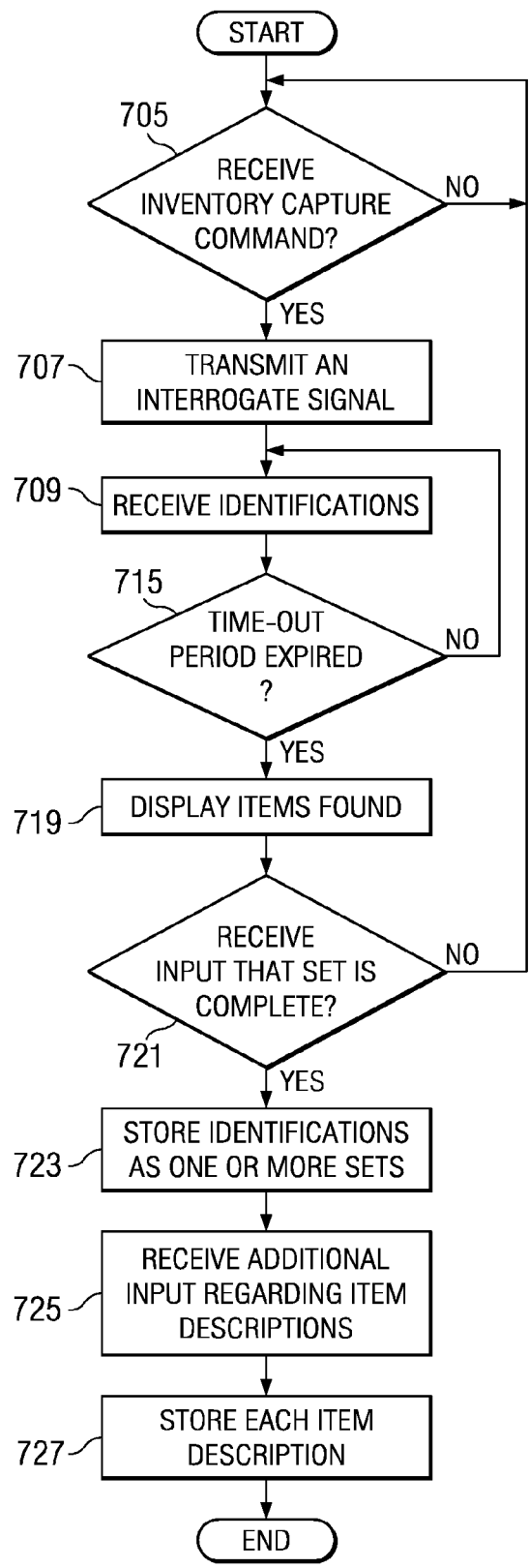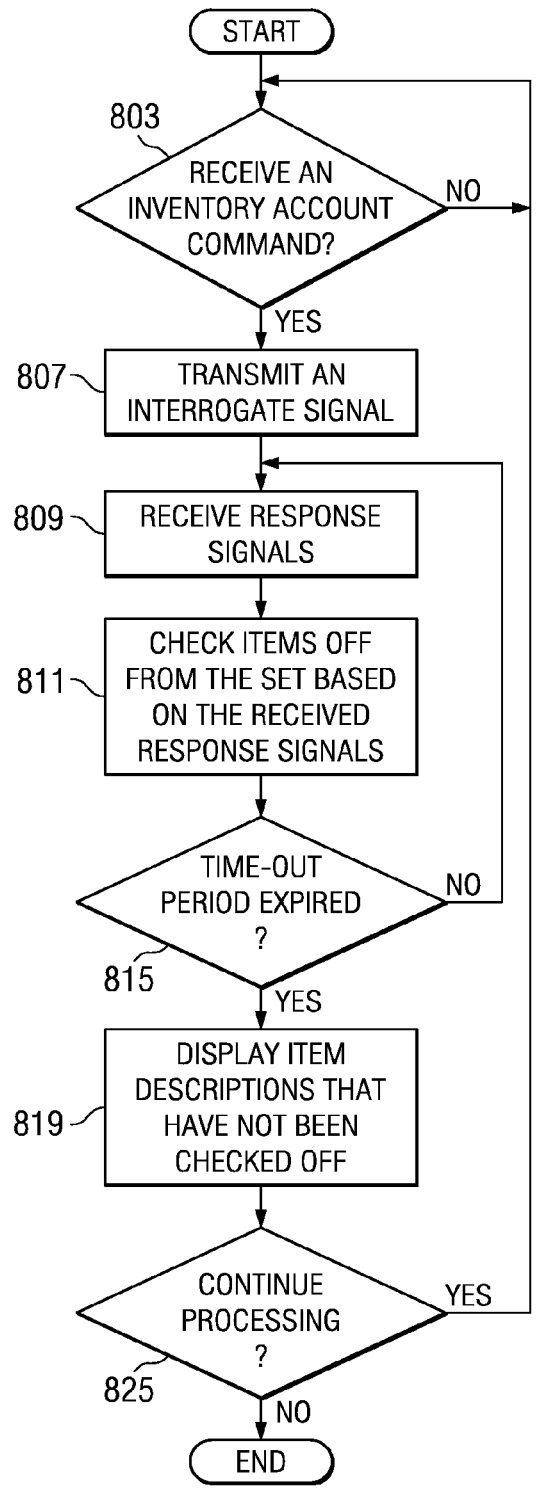

METHOD AND APPARATUS FOR TRACKING OR IDENTIFYING ITEMS IN A SET

BACKGROUND OF THE INVENTION

1. Field of the Invention

The present invention relates generally to tracking inventory in a set. More particularly, the present invention relates to a method and apparatus for creating set information for items within an interrogation zone, saving the complete set information, and identifying completeness of the set, either in the same or an alternate interrogation zone.

2. Description of the Related Art

Radio tag readers can track items in warehouses and stores. Radio tag readers can be used to count items that carry an identical identification radio tag, provided that the identification radio tag is within a radio range of a radio tag reader.

An identification radio tag is a device that receives a radio signal. In response to receiving the radio signal, the identification radio tag transmits a response signal. The response signal can be read by a radio tag reader. The radio tag reader receives the response signal, which can contain identification codes. The radio tag reader can then use the identification codes to identify the item associated with the identification radio tag response signal. Note that the radio tag reader can also be the source of radio signals received by the identification radio tag.

An identification code is a code suitable for identifying an item. The identification code is stored in an identification tag. The identification code is, for example, a universally unique identifier (UUID). Together, the radio identification tag or tags and the radio tag reader are referred to as a radio frequency identification (RFID) system.

Radio frequency identification systems have many uses. For example, a person can quickly count a large number of items accurately using a radio frequency identification system, even though the items may be hidden within boxes or behind other items. Another use for a radio frequency identification system is to indicate whether a tagged item has entered an unauthorized area. For example, a tag reader or an identification tag itself can sound an alarm when a tagged item passes through a checkpoint. This alarm permits a store-owner or operator to know when goods have left the store. However, among the drawbacks to the known art is that it does not allow for the creation of sets using radio frequency identification, and tracking of items using radio frequency identification set information.

Thus, prior art radio frequency identification systems do not provide for creation of sets within an interrogation zone and tracking of those created sets in the interrogation zone. An interrogation zone is a volume of space surrounding a source of one or more interrogate signals. An interrogate signal is a signal adapted such that when one or more identification radio tags receive the interrogate signal, the one or more particular identification radio tags respond by transmitting a predetermined response signal. The predetermined response signal can be a radio signal that includes an identification code, along with other information.

As stated above, currently available systems do not provide an ability to create sets of one or more items using radio frequency identification tags, and to track of items as a complete set using radio frequency identification tags. Thus, it would be advantageous to have an improved method, apparatus, and computer usable program code to associate distinct items together as a set and to verify completeness of the set within the original interrogation zone or different interrogation zones.

BRIEF SUMMARY OF THE INVENTION

Illustrative embodiments provide a computer implemented method, apparatus, and computer usable program code for determining whether a set of items is complete. An interrogate signal is transmitted from a tag reader into an interrogation zone. Each item returning a response signal to the tag reader in response to the interrogate signal is included in a checked item set. The checked item set is compared to a set data. The set data identifies all items in a set of items, the set data is included in at least one tag associated with at least one item in the set of items, and the set data is included in at least one response signal received at the tag reader. A determination is made whether the set of items is complete, wherein the set of items is complete if every item identified in the set data is included in the checked item set.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram of a network, the network including a tag reader, with a user interface, in communication with a description pair server, in accordance with an illustrative embodiment;

FIG. 4 is a diagram of a data structure that associates an identification code with an item description in accordance with an illustrative embodiment;

FIG. 5A is a diagram of an interaction of a tag reader with an identification tag in accordance with an illustrative embodiment;

FIG. 5B is a diagram of an interaction of a tag reader with an identification tag in accordance with an illustrative embodiment;

FIG. 7 is a flowchart of steps executed in a data processing system to form a set in accordance with an illustrative embodiment;

FIG. 8 is a flowchart of steps executed in a data processing system to display items not found in a set in accordance with an illustrative embodiment.

DETAILED DESCRIPTION OF THE INVENTION

Figure 1:
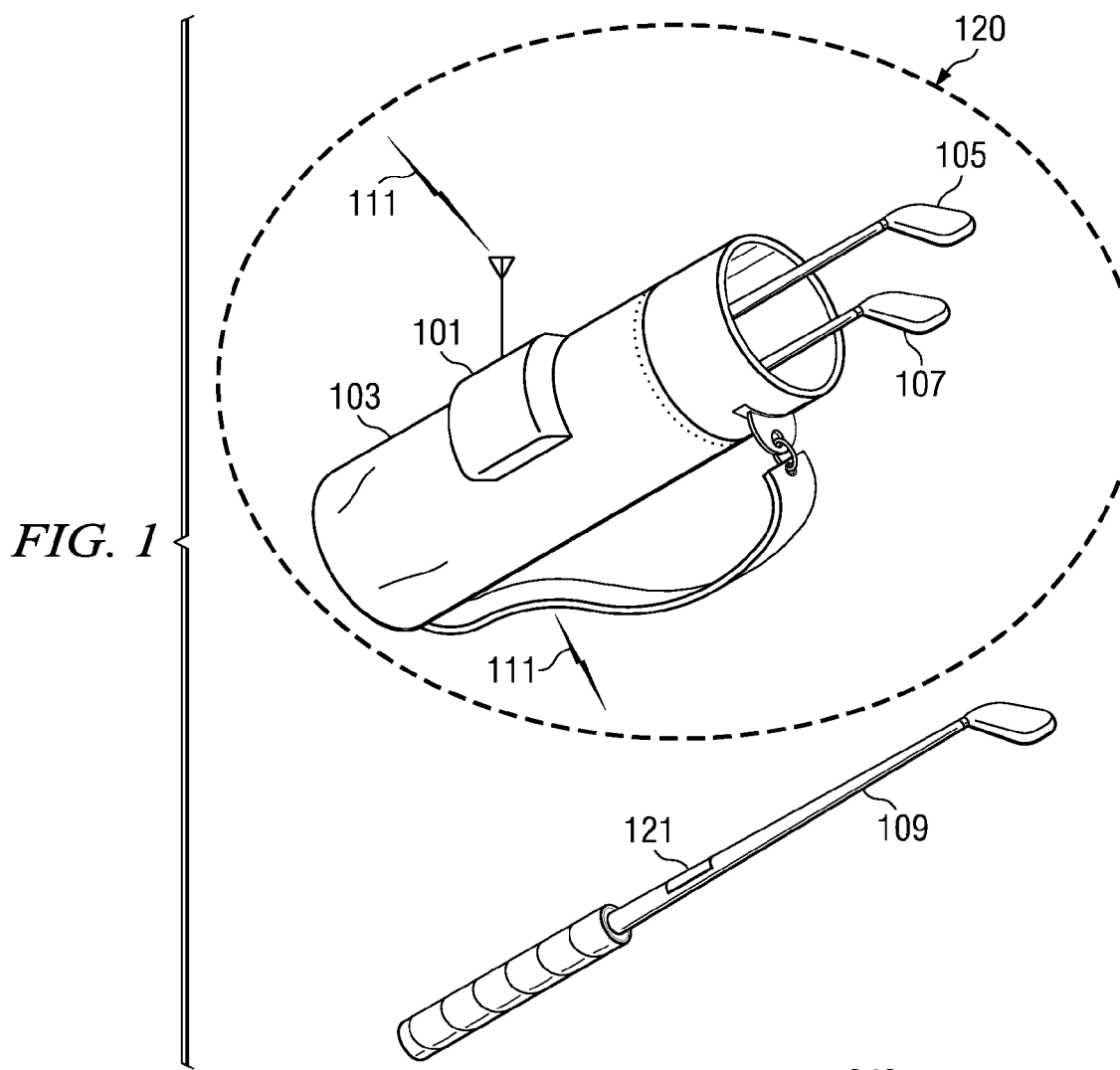
FIG. 1 is a diagram of a tag reader operating in relationship to items in a set in accordance with an illustrative embodiment.

FIG. 1 is a diagram of a tag reader operating in relationship to items in a set in accordance with an illustrative embodiment. Although the illustrative example shown in FIG. 1 is a golf bag holding a set of golf clubs, a set of items can be nearly any set of items. For example, a set of items could be a set of surgical instruments, a set of tools, a set of watches, or a set of completely disparate items grouped together by a user or manufacturer. Golf bag 103 could be replaced by a tool box, a tray, or any other suitable holder. Additionally, golf bag 103 is not necessary to the methods and devices described herein, as the holder of the items in the set is for convenience only. For example, a tag reader could be separate from the holder of the set of items and the set of items placed anywhere within an interrogation zone, as described further below. Additionally, a set of items can be any number of items, including one item.

Returning to FIG. 1, tag reader 101 is attached to golf bag 103, though tag reader 101 can be a stand-alone device. A user may carry driver 105 and pitching wedge 107 in golf bag 103. While in the golf bag and nearby the golf bag, the golf clubs are located within interrogation zone 120. Interrogation zone 120 is a zone or volume of space within which an interrogate signal can be propagated by tag reader 101 in this example. The size of interrogation zone 120 may be set by a user or by a manufacturer of tag reader 101. An interrogate signal is a signal calibrated to trigger radio frequency responses from one or more identification tags when the tags receive the signal. For example, an interrogate signal may be interrogate signal 111.

In the illustrative example shown in FIG. 1, interrogation zone 120 is a volume of space surrounding tag reader 101, which serves as an interrogate signal source. The interrogation zone can extend to the extent that an identification tag can receive an interrogate signal, and responsively transmit identification codes. In the illustrative example, interrogate zone 120 extends a distance around golf bag 103. However, the range of the identification tag can be modified such that interrogate zone 120 extends only within or immediately adjacent golf bag 103. Thus, interrogation zone 120 can also be characterized as the limit for two-way communication between a tag reader and an identification tag.

Although driver 105 and pitching wedge 107 lie within interrogation zone 120, putter 109 is outside interrogation zone 120. Putter 109 is fastened to identification tag 121. Interrogate signal 111 may reach putter 109. However, identification tag 121 may not be able to respond with a signal sufficiently strong for reception at tag reader 101.

The embodiments described herein are not limited to tracking golf clubs in and around a golf bag. Other embodiments can be used to track other sets of items. For example, sets of luggage from a particular airplane can be tracked within an airport. Sets of children carrying identification tags in worn items can be tracked within an amusement park or other area. Sets of surgical instruments can be tracked within an operating room. Sets of tools can be tracked within a garage or within a particular tool box. In another example, sets of contents within a packing carton can be identified and tracked, such as a DVD player, a remote control, the user manual, and some DVD disks. Tracking or identifying these items is especially useful upon sale or return of these items. The items may be totally unrelated depending on the implementation. The creation of the set content information may occur at the manufacturer of the set, in cases of pre-definable sets, or may be initiated by a user to create a personally defined set of items.

In any of these cases, a user can query the interrogation zone for responding identification tags. Illustrative embodiments of the invention can identify when one or more items in a set are missing from the set of items, or otherwise removed from the set. Moreover, the illustrative embodiments can confirm to a user that all items of the set are within the original or an alternate interrogation zone. In addition, illustrative embodiments can operate without the need to store the set of items internally, such as in devices within the original interrogation zone. Examples of devices that can store sets of items internally include one or more writeable radio frequency identification tags on one or more of the set items, a writable radio frequency identification tag on a proxy device that travels with the set of items (such as a proxy tag), a description pair server, or a set database server. In addition, items in a first set can be distinguished from items in a second set, even when the items in the first set are in the same volume of space as the items in the second set.

Figure 2:
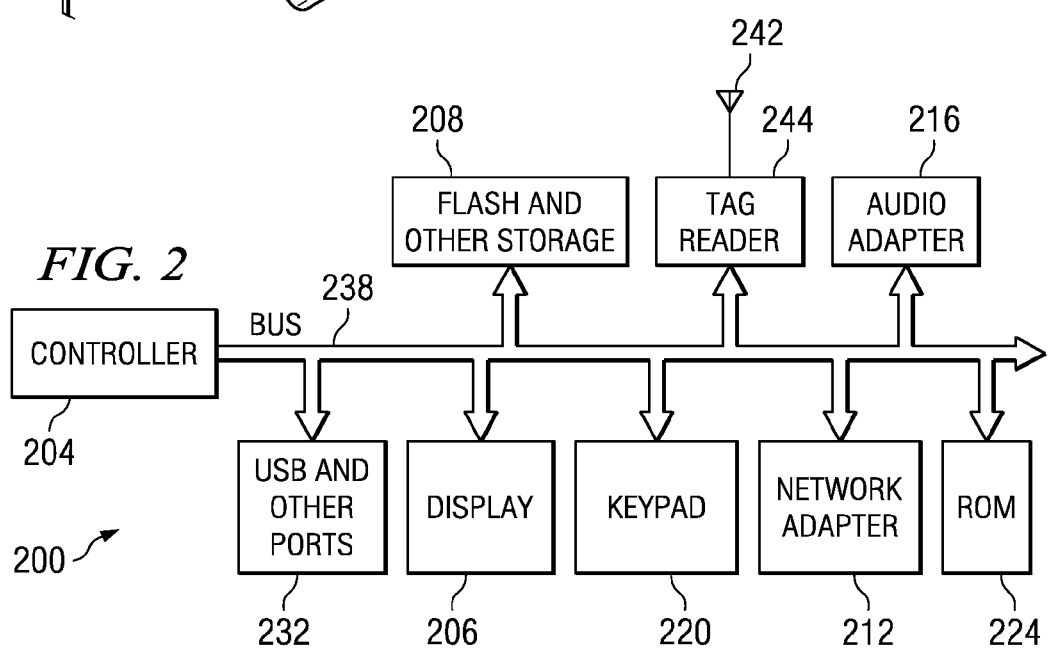
FIG. 2 is a block diagram of a tag reader in accordance with an illustrative embodiment.

FIG. 2 is a block diagram of a tag reader in accordance with an illustrative embodiment. Tag reader system 200 can be, for example, tag reader 101 of FIG. 1. Tag reader system 200 operates as directed by controller 204. Controller 204 communicates via bus 238 to receive program instructions that may be stored in read-only memory (ROM) 224. Flash and other storage 208 operate as memory to store information in accordance with the program instructions. Both read-only memory 224 and flash and other storage 208 are types of memory.

A user may use keypad 220 to enter data to tag reader system 200. Tag reader system 200 may respond with outputs shown on display 206 or alerts sounded through audio adapter 216. Tag reader system 200 may communicate to other network elements via network adapter 212 or through USB and other ports 232. Network adapter 212 may connect to a network using wired or wireless media. Network adapter 212, and USB and other ports 232 are examples of communications units.

Tag reader 244 operates to send interrogate signals to a surrounding interrogation zone. An interrogation zone may be interrogation zone 120 of FIG. 1. Tag reader 244 may transmit interrogate signals and receive response signals via antenna 242.

Illustrative embodiments provide a computer implemented method, apparatus, and computer usable program code for determining whether a set of items is complete. An interrogate signal is transmitted from a tag reader into an interrogation zone. Each item returning a response signal to the tag reader in response to the interrogate signal is included in a checked item set. A checked item set is a data structure that includes data that describes those tags, and hence those items, that have responded to the interrogate signal during a timeout period. The checked item set is compared to a set data. The set data identifies all items in a set of items, the set data is included in at least one tag associated with at least one item in the set of items, and the set data is included in at least one response signal received at the tag reader. Set data is data included in a data structure, the data at least identifying all items included in a set of items. Set data can also include information describing the set, such as a set identifier and possibly characteristics of the set such as set name or set attributes, and/or information describing attributes of the items in the set. A determination is made whether the set of items is complete, wherein the set of items is complete if every item identified in the set data is included in the checked item set.

Furthermore, the illustrative embodiments described herein provide a method for determining if an item is present in a set of items. For example, the illustrative embodiments described herein can determine whether a particular inch socket wrench is present in a set of socket wrenches. The size of the interrogation zone can be set by either the user or the manufacturer. Thus, for example, items in a set can be tracked within a small area, such as a toolbox, or in a larger area, such as a garage.

FIG. 3 is a diagram of a network 307, the network 307 including a tag reader 301, with a user interface, in communication with a description pair server 313, in accordance with an illustrative embodiment. Tag reader 301 can be tag reader system 200 or tag reader 244 of FIG. 2, which includes a user interface.

A description pair server is a network or local resource that can store data structures such as data structure 400. Thus, a description pair server can be a computer or other data processing system capable of communicating with the tag reader or one or more of the identification tags.

A description pair server can be responsive to, or otherwise include, a user-entered description for an item. For example, a user may own a nine iron golf club having an identification tag. In this case, the user can enter a description, "John Smith's nine iron." The user preferably enters such a description during a time when the user's nine iron is exposed to an interrogation zone of tag reader 301. Tag reader 301 may transmit such a description to description pair server 313 via network 307.

In various embodiments, network 307 can be a private network, public network, wireless network, or any other type of network. Tag reader 301 can connect via network 307 to description pair server 313.

In addition, proxy tag (not shown) can be used to store information associated with a set or information associated with items in a set. A proxy tag is a writeable radio frequency identification tag that is used to store information associated with a set, such as a set identification name or number, and/or information associated with items in a set. A proxy tag could be used to store the set information in cases where the set information travels with the set. Proxy tags are also useful in cases where none of the set items have writeable radio frequency identification tags or cases where a proxy tag would be less likely to be missing from the set. Thus, tag reader 301 can communicate with a proxy tag in order to retrieve information about the set, about which items are in a set and/or information about those items in the set.

A proxy tag can be physically associated with the set of items. For example, a proxy tag can be attached to golf bag 103 of FIG. 1, driver 105 of FIG. 1, pitching wedge 107 of FIG. 1, or any other item associated with the set of items to be tracked. A proxy tag can also be a supplementary device whose sole purpose is to travel with the set to retain set information.

FIG. 4 is a diagram of a data structure that associates an identification code with an item description. Data structure 400 is an example of data stored within a description pair server, for example, description pair server 313 of FIG. 3. Data structure 400 can also be contained in a tag reader, such as tag reader 301 of FIG. 3, tag reader 244 of FIG. 2, or tag reader 101 of FIG. 1. Data structure 400 can also be contained in an identification tag, such as a proxy tag. Data structure 400 can also be used as the data structure in which a set of particular items are stored.

Data structure 400 shows a data pair. A data pair is an identification code associated with an item description. For example, identification code "10101010111111" 401 is associated with item description "John Smith's 9 iron" 403. An item description is a human understandable description of an item. Human understandable descriptions are for example, text, audio, and/or graphic outputs, or other representations suited for human interpretation. Other examples of identification codes include, for example, "1234564", "A", or any other code that is unique among all identification codes that a tag reader will read with respect to a given set of items.

As described above, a tag reader operates cooperatively with identification tags. Manufacturers manufacture at least two types of identification tags. For example, a read-only identification tag is a tag that provides a response signal, but does not have a memory. Manufacturers also manufacture a read-write identification tag. A read-write identification tag is a tag that responds to write signals by writing data to a memory within the identification tag. A read-write tag can respond to interrogate signals by sending a stream of data encoded on a radio frequency carrier. The stream of data can be large enough to carry multiple identification codes and/or item descriptions. Thus, a tag reader that also has write capabilities can be used to save information relating to sets into read-write tags. Information relating to sets at least identify all items included in a set of items and can optionally also include additional information describing the set, or additional information describing the items in the set.

FIG. 5A is a diagram of an interaction of a tag reader with an identification tag in accordance with an illustrative embodiment. Tag reader 501 can be tag reader 301 of FIG. 3, tag reader 244 of FIG. 2, or tag reader 101 of FIG. 1.

Tag reader 501 transmits interrogate signal 511 to or through an interrogation zone. Item 505 is physically within the interrogation zone. Identification tag 507 is attached to item 505, close to item 505, or otherwise physically associated with item 505. Item 505 can be physically associated with identification tag 507 by the user, via purchasing an identification tag kit, or by the manufacturer of item 505. In any case, identification tag 507 responds to interrogate signal 511 by transmitting response signal 513. Tag reader 501 then receives the response signal 513.

Tag reader 501 can further process the response signal to form a set by including item 505 in a desired set. Tag reader 501 can remotely store set items at set database 503. Set database 503 can be stored on a remote server, such as description pair server 313 of FIG. 3, or proxy tag 315 of FIG. 3. Set database 503 can also be stored in tag reader 501, itself. Set database 503 can also be stored in one or more tags on items in the set itself, such as tag 507.

FIG. 5B is a diagram of an interaction of a tag reader with an identification tag in accordance with an illustrative embodiment. Tag reader 551 can be tag reader 501 of FIG. 5A, tag reader 301 of FIG. 3, tag reader 244 of FIG. 2, or tag reader 101 of FIG. 1.

Tag reader 551 transmits interrogate signal 561 to or through an interrogation zone. Item 555 physically lies within the interrogation zone. Identification tag 557 is attached to item 555, close to item 555, or otherwise physically associated with item 555. Item 555 can be physically associated with identification tag 557 by the user, via purchasing an identification tag kit, or by the manufacturer of item 555.

Identification tag 557 receives interrogate signal 561 via antenna 565. Antenna 565 can be any means for receiving radio signals. Identification tag 557 then responds with response signal 563 via antenna 565.

Tag reader 551 receives response signal 563. Tag reader 551 may transmit additional signal 575 to identification tag 557. Circuit 573 can decode additional signal 575 to obtain the identification codes for the set to which item 555 belongs. Circuit 573 can write the identification codes to memory 579. Identification codes can also be included in one or both of signal 561 and signal 563.

Figure 6:
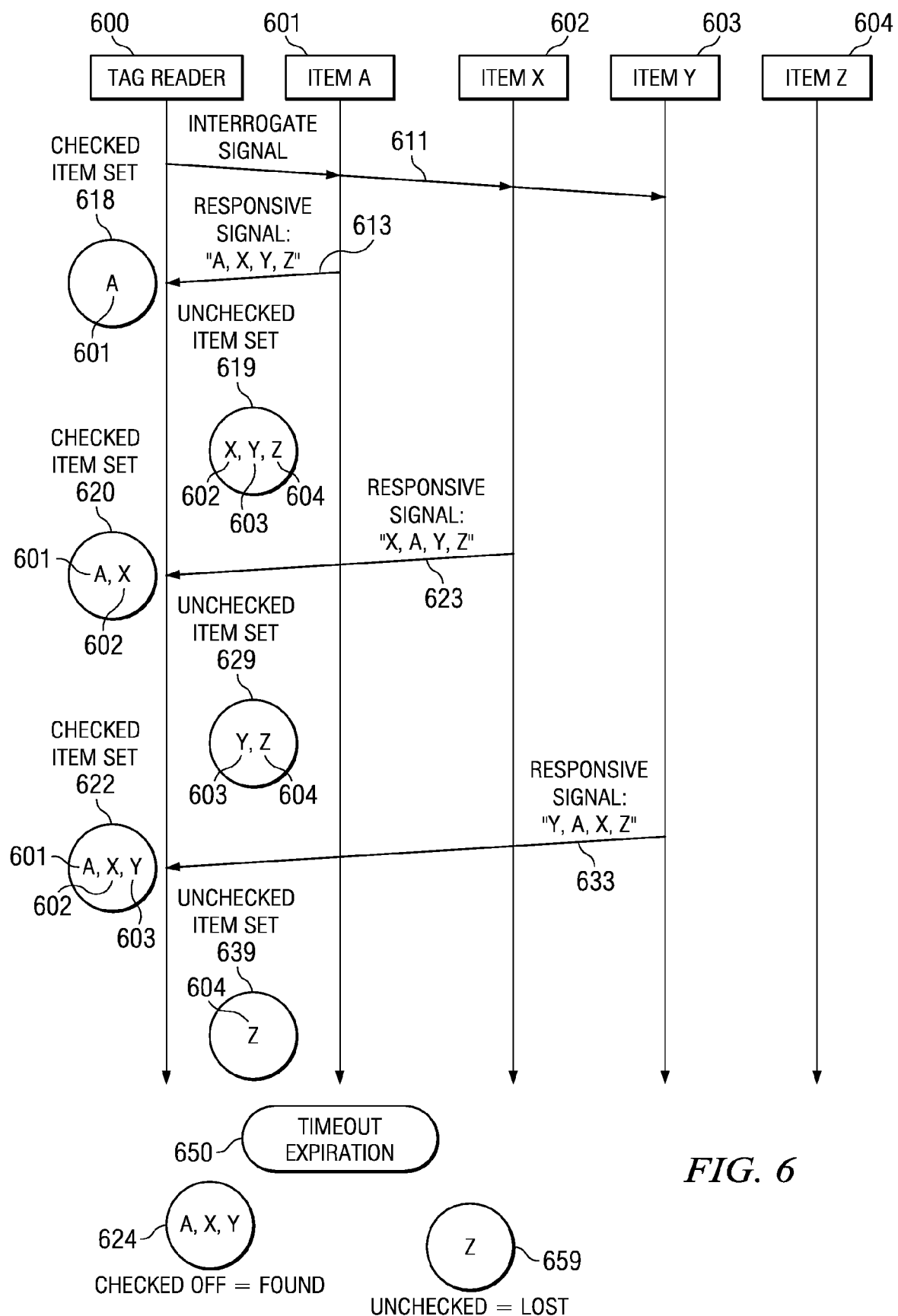
FIG. 6 is a flow diagram of signals sent among a user interface, a tag reader, and identification tags in accordance with an illustrative embodiment.

FIG. 6 is a flow diagram of signals sent among a user interface, a tag reader, and identification tags in accordance with an illustrative embodiment. Tag reader 600 can be tag reader 551 of FIG. 5B, tag reader 501 of FIG. 5A, tag reader 301 of FIG. 3, tag reader 244 of FIG. 2, or tag reader 101 of FIG. 1.

Item A 601 carries a read-write tag that stores an identification code, such as identification code 401 of FIG. 4. Item X 602 carries a read-write tag that stores an identification code, such as identification code 401 of FIG. 4. Item Y 603 carries a read-write tag that stores an identification code, such as identification code 401 of FIG. 4. Item Z 604 exists, but is not within an interrogate zone. Thus, the identification tag associated with Item Z 604 does not respond. As a result, Item Z 604 does not contribute directly to the communication of signals in FIG. 6.

Initially, tag reader 600 broadcasts interrogate signal 611. Item A 601 responds with response signal 613. Response signal 613 includes one or more identification codes that identify Item A 601 and possibly one or more characteristics of Item A 601. In addition, response signal 613 may contain the complete list of set members A, X, Y, and Z, and possibly descriptions for all the set members.

Tag reader 600 may form two sets, checked item set 618 at time 1 and unchecked item set 619 at time 1. A checked item set is a data structure that includes data that describes those items that have responded during a timeout period. An unchecked item set is a data structure that includes data that describes those items that have not responded during a timeout period. For example, the initial unchecked item set may be the complete list of set members transmitted from the read-write tag, less the self-identifying identification code. A tag reader may store an unchecked item set or a checked item set in any suitable memory, such as memory 208 of FIG. 2.

At this stage, checked item set 618 includes at least the identification of Item A 601. Similarly, at this stage, unchecked item set 619 includes at least the corresponding identifications of Item X 602, Item Y 603, and Item Z 604.

Next, in this illustrative example, Item X 602 responds to interrogate signal 611 with response signal 623. Response signal 623 includes at least an identification of Item X 602, and possibly one or more identification codes describing characteristics of Item X 602.

Tag reader 600 then matches the identification of Item X 602. Tag reader 600 removes an identification code corresponding to Item X 602 from unchecked item set 619 to form unchecked item set 629 at time 2. Likewise, tag reader 600 includes Item X 602 in checked item set 620 at time 2. In this illustrative embodiment, time 2 is the same as time 1. However, identification tags can respond at slightly different times. Thus, time 2 is not necessarily the same as time 1.

Continuing the illustrative example, Item Y 603 responds to interrogate signal 611 with response signal 633. Response signal 633 includes at least an identification of Item Y 603, and possibly one or more identification codes describing characteristics of Item Y 603.

Tag reader 600 then matches the identification of Item Y 603. Tag reader 600 removes an identification code corresponding to Item Y 603 from unchecked item set 629 to form unchecked item set 639 at time 3. Likewise, tag reader 600 includes Item Y 603 in checked item set 622 at time 3. In this illustrative embodiment, time 3 is the same as time 1 and time 2. However, identification tags can respond at slightly different times. Thus, time 3 is not necessarily the same as time 1 and is not necessarily the same as time 2.

Eventually, timeout 650 expires. Tag reader 600 can track whether timeout 650 expires. When timeout 650 expires, tag reader 600 determines a final unchecked item set and a final checked item set. Final unchecked item set 659 corresponds to unchecked item set 639 at time 3. Thus, final unchecked item set 659 includes the identification of Item Z 604. Similarly, final checked item set 624 corresponds to checked item set 622 at time 3. Thus, final checked item set 624 includes the identification of Item A 601, Item X 602, and Item Y 603.

Next, tag reader 600 can report final checked item set 624, final unchecked item set 659, or both to a user. Tag reader 600 can report to a user via a visual display or an audio speaker. Thus, in this case, tag reader 600 reports to the user that Item Z 604 is missing from the total set of items, but that Item A 601, Item X 602, and Item Y 603 are within the total set of items. The total set of items in this case is the union of final set of unchecked items 659 and final set of checked items 624, such that the total set of unchecked items includes Item A 601, Item X 602, Item Y 603, and Item Z 604.

The process of verifying completeness of a set shown in FIG. 6 can be varied. The initial set information, which includes the items included in a set and/or information associated with those items, can be retrieved or determined via a number of methods. For example, the initial set information can be stored in the tag reader. The initial set information can also be stored in a proxy tag or in one or more of the tags associated with Item A 601, Item X 602, Item Y 603, or Item Z 604 after interrogating items within an inquiry interrogation zone. The inquiry interrogation zone can be the same or different than the original interrogate zone used to create the set information. Similarly, the manufacturer can cause the initial set information to be pre-stored in a proxy tag or one of the tags associated with one of the items. The initial set information may also be obtained from a set database on a server that was previously created and pre-stored when the original set information was determined.

In addition, tag reader 600 need not be the same tag reader that establishes the items in a set. For example, tag reader 600 can be a different tag reader that retrieves previously saved data identifying the set, identifying which items are part of the set, and optionally information about the set items from a proxy tag or any identification tag associated with the items in the set.

In this case, tag reader 600 retrieves the set information by transmitting an interrogate signal into the interrogation zone and analyzing the response signals that come back to tag reader 600 from the proxy tag and/or any identification tags within the interrogation zone. Alternatively, tag reader 600 can retrieve the set information by communicating with a description pair server. Thereafter, tag reader 600 can perform the steps described above vis-à-vis FIG. 6. Thus, if one or more items are not within the interrogation zone, then tag reader 600 can provide an alert that indicates that those items are missing, even if tag reader 600 did not initially contain information regarding which items are in a set. Accordingly, the process of creation and storage of the set information can be separated from the process of verification of which items are in a set within an interrogation zone.

FIG. 7 is a flowchart of steps executed in a data processing system to form a set in accordance with an illustrative embodiment. In this illustrative example, a tag reader is the data processing system that executes the steps of FIG. 7. The tag reader described in FIG. 7 can be tag reader 551 of FIG. 5B, tag reader 501 of FIG. 5A, tag reader 301 of FIG. 3, tag reader 244 of FIG. 2, or tag reader 101 of FIG. 1. Note that the process shown in FIG. 7 may not be necessary if the manufacturer pre-establishes the items included in a set and/or pre-establishes information regarding items of a set. In this case, the manufacturer can cause the set information to be stored in a tag reader, an identification tag, a proxy tag, a description pair server, or any other suitable storage device.

Initially, the tag reader determines if the tag reader has received an inventory capture command (step 705). An inventory capture command is a signal indicative of a command to identify or capture items in the interrogation zone into one or more sets. Thus, an inventory capture command places the tag reader into a mode of operation in which the tag reader accepts sets. A user may generate or input an inventory capture command using the tag reader.

A negative determination at step 705 prompts the tag reader to continue re-executing step 705. A positive determination to step 705 causes the tag reader or some other device to transmit an interrogate signal (step 707). The interrogate signal is propagated through an interrogation zone. An interrogate signal may be interrogate signal 511 of FIG. 5A.

In response to receiving the interrogation signal, the identification tags transmit response signals. The response signals contain identifications that uniquely identify the items. An identification can be implemented using a radio signal, a wavelength of a radio signal, or a code contained within a radio signal. An identification can also include information describing an item by using codes within a response signal. An item can be assigned an identification by many methods. For example, automated assembly machinery on an assembly line can assemble items together as a set, providing each item with an identification tag. Alternatively, a user can provide input regarding user-defined sets by manually assigning identification tags to items.

The tag reader receives the identifications from the items in the set via the response signals (step 709). The tag reader stores the identifications. Optionally, the tag reader only stores the identity of each item transmitting a response signal.

Next, the tag reader optionally tests to determine if a time-out period has expired (step 715). A time-out period is a period of time after which some event will take place. In this case, the time-out period is a time long enough that a tag reader would likely receive identification codes from all identification tags in an interrogation zone. If the time-out period has not expired, the tag reader continues to re-execute steps 709 and 715. A positive outcome to step 715 causes the tag reader to display or announce one or more items found in the previous steps (step 719).

Next, the tag reader optionally awaits user input or other input that the set is complete (step 721). For example, a user can confirm that a set is complete by pressing a button on the tag reader. If the tag reader receives a confirmation that the set is complete, then the tag reader continues to the next step at step 723. However, if the tag reader does not receive confirmation that the set is complete, then the tag reader repeats the process, beginning again at step 701. If this step 721 is not used, then the tag reader automatically determines when the set is complete.

During this step 721, the user could edit the one or more sets in the tag reader. For example, the user may have extra items within the interrogation zone that have identification tags, but that the user does not want included in the desired set or sets. The user can remove these extra items from the set or sets. Additionally, the user could manually add additional items into the set or sets by manually entering identifications. Thus, the user can manually add items to a set regardless of whether or not the tag reader has received a response signal for the additional items. A user can also manually add or subtract items from a set before the tag reader receives an inventory capture command at step 705.

Continuing with the process shown in FIG. 7, a positive outcome to step 721 prompts the tag reader to store items as one or more sets (step 723). The tag reader can remotely store the set or sets at a description pair server. The set or sets also can be stored as a sequence of identification codes in a memory of one or more of the identification tags, rather than in the tag reader itself. The step of remotely storing includes, for example, the tag reader transmitting additional signal 575 of FIG. 5B.

Optionally, the tag reader can receive additional input regarding item descriptions (step 725). The tag reader then stores each additional item description (step 727). Optionally, additional item descriptions can be stored remotely at a description pair server or remotely in the identification tags themselves.

Attendant with step 727, the tag reader may remotely store each item description with a corresponding identification code. For example, the tag reader may transmit a data pair to each read-write identification tag. The data pair is, for example, data structure 400 of FIG. 4. The read-write identification tag, in response, writes the set as data pairs to memory. Processing terminates thereafter.

In an illustrative example, six identification tags are attached to six golf clubs. Each identification associated with an identification tag is unique. Each identification is input into the tag reader via a response signal transmitted from each identification tag. The tag reader then associates the golf clubs as a set.

Alternatively, the tag reader does not associate the golf clubs into a set, but in this case a user provides input to designate the six golf clubs as belonging to a set.

Alternatively, a user can provide input to designate three of the golf clubs as belonging to a first set and the other three golf clubs as belonging to a second set, or any other combination.

Additional illustrative embodiments may vary the sequence of steps shown in FIG. 7. In another illustrative example, the tag reader can receive one or more identifications associated with one or more sets. For example, multiple sets of items can exist within the interrogation zone. An identification, such as a wavelength of a response signal or a code contained within the response signal, can be used to distinguish between multiple sets of items within an interrogation zone. Hence, for example, the tag reader can distinguish individual golf clubs within an interrogation zone as belonging to one of a first set of golf clubs owned by a first player and a second set of golf clubs owned by a second player.

FIG. 8 is a flowchart of steps executed in a data processing system to display items not found in a set in accordance with an illustrative embodiment. In this illustrative example, a tag reader is the data processing system that executes the steps of FIG. 8. The tag reader described in FIG. 8 can be tag reader 551 of FIG. 5B, tag reader 501 of FIG. 5A, tag reader 301 of FIG. 3, tag reader 244 of FIG. 2, or tag reader 101 of FIG. 1.

The tag reader begins executing the process by determining if the tag reader has received an inventory account command (step 803). A user may enter an inventory account command when a user would like to determine if any item in a set is missing. An inventory account command is a signal received from a user or a device. For example, a user may generate an inventory account command by pressing a button on the tag reader. If the tag reader receives no inventory account command, the tag reader continues to re-execute step 803.

In response to a positive determination to step 803, the tag reader transmits an interrogate signal to or through an interrogation zone (step 807). In response, identification tags transmit corresponding response signals, possibly including identification codes. The tag reader receives the corresponding response signals, which include identification codes (step 809).

Next, the tag reader checks off one or more items from the set based on the received response signals (step 811). For example, if the tag reader receives a response signal corresponding to a particular item, then that item is known to be within the interrogation zone. Because, in this example, the user does not wish to have found items displayed, items known to be within the interrogation zone are checked off. The term "checked off" means that the item is excluded from the set of items not found within the interrogation zone.

Optionally, the tag reader then determines whether a time-out period has expired (step 815). If the time-out period has not expired, the tag reader continues processing at step 809. However, if a time-out period has expired, the tag reader displays item descriptions that have not been checked off within the time-out period (step 819).

Next, the tag reader determines whether to continue processing (step 825). If the tag reader continues processing, the tag reader repeats the process, beginning at step 803. However, if the tag reader does not continue processing, the process terminates.

Additional methods can be added to the method shown in FIG. 8. For example, after an affirmative result to the continue processing determination at step 825, the tag reader can automatically generate another inventory account command at step 803. Later, at step 819, the tag reader can produce a visual cue and/or an audible cue to a user whenever an item has been removed from a set. Thus, if the entire process is repeated every few seconds or less, then a user can be instantly alerted whenever an item is removed from a set.

Additionally, the tag reader can simultaneously track multiple sets of items within the same interrogation zone. In this case, the tag reader performs the process shown in FIG. 8 for each set at any given point in time. By using different wavelengths of radio signals, by using identification codes within the interrogate signal or signals, or by using identification codes within the corresponding response signals, or a combination thereof, a tag reader can track any number of sets of items within an interrogation zone. In this case, the tag reader can inform a user regarding sets of items found or sets of items not found, or both, using different audio or visual cues. For example, different tones can be used to indicate the presence or absence of items within a set. Different screens or different portions of a screen can be used to display information regarding multiple sets.

Figure 9:
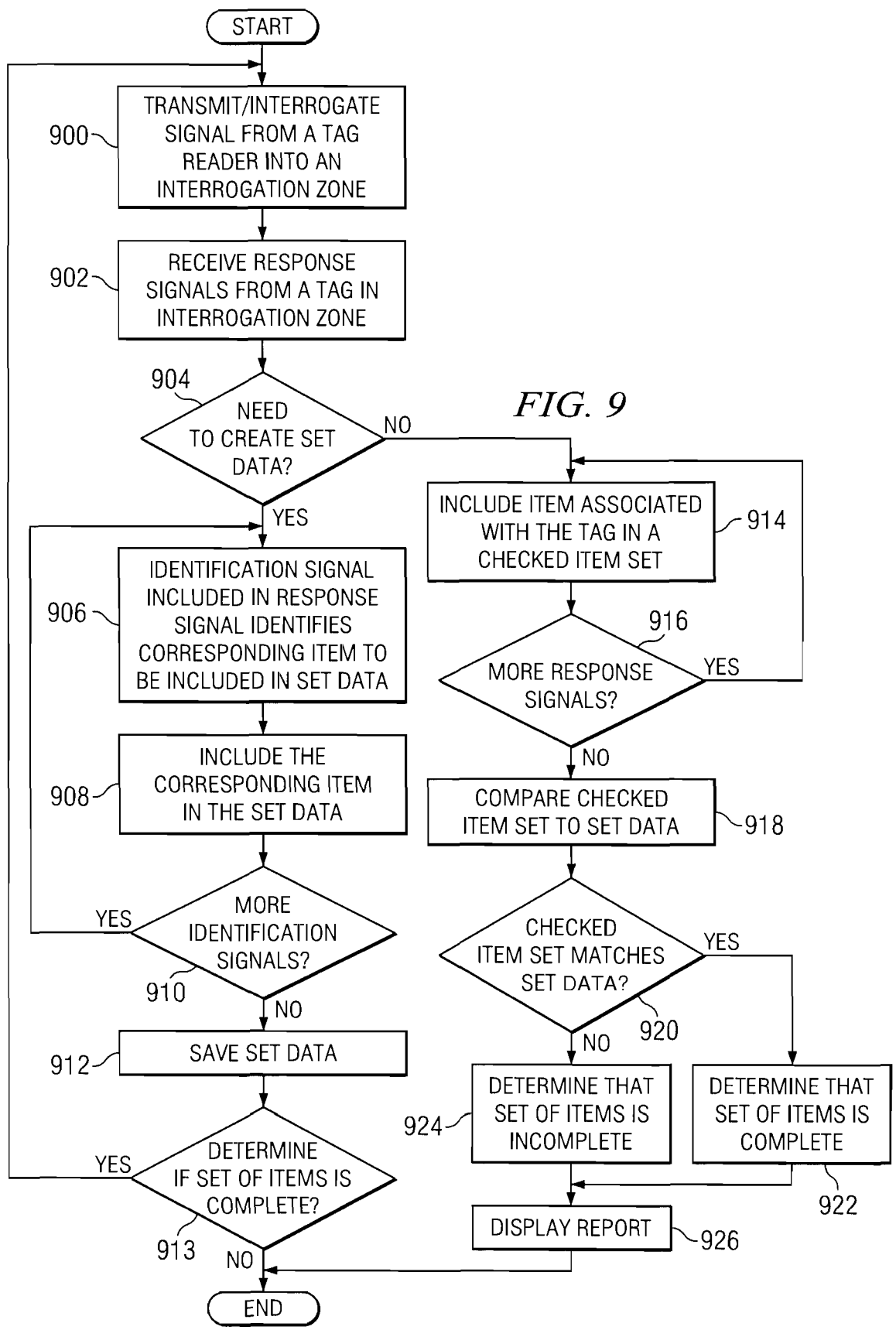
FIG. 9 is a flowchart of steps executed in a data processing system to determine if a set of items is complete in accordance with an illustrative embodiment.

FIG. 9 is a flowchart of steps executed in a data processing system to determine if a set of items is complete in accordance with an illustrative embodiment. In this illustrative example, a tag reader is the data processing system that executes the steps of FIG. 9. The tag reader described in FIG. 9 can be tag reader 551 of FIG. 5B, tag reader 501 of FIG. 5A, tag reader 301 of FIG. 3, tag reader 244 of FIG. 2, or tag reader 101 of FIG. 1. The interrogation zone described with respect to FIG. 9 can be interrogation zone 120 of FIG. 1. Similarly, response signals, interrogate signals, and tags described with respect to FIG. 9 can be response signals, interrogate signal 111 and tag 121 shown in FIG. 1. However, the data processing system implementing the steps of FIG. 9 can be any data processing system and the various other features described herein can be varied.

The process begins as the tag reader transmits an interrogate signal into an interrogation zone (step 900). In response, the tag reader receives a response signal from a tag in the interrogation zone (step 902).

The tag reader then determines if a need exists to create set data (step 904). If set data does not need to be created, then the process continues at step 914, as described further below. Set data might not be needed for a variety of reasons. For example, set data might not be needed in the case where the manufacturer has pre-determined the set data. In this case, for example, the manufacturer can determine that driver 105 and pitching wedge 107, as shown in FIG. 1, form the items that make up a complete set. In this case, the set data includes at least an identification of driver 105 and pitching wedge 107 and the manufacturer can pre-define this particular variation of set data. Set data can be pre-determined for any number of items or for different kinds of items in order to define the set fully. Similarly, set data might not be needed in the case where set data has already been created.

However, if the set data needs to be created, then the tag reader reads an identification signal included in the response signal to identify a corresponding item to be included in the set data (step 906). Alternatively, the tag reader or some other device can transmit a second interrogation signal at a different frequency or a second interrogation signal including a particular command to cause the tag to respond with identification data for purposes of creating a set. In either case, the tag reader includes the corresponding item in the set data (step 908).

The tag reader then determines whether more identification signals are to be processed (step 910). If more identification signals are to be processed, then the process returns to step 906 and the process repeats between steps 906 and 910 until all identification signals to be processed have been processed.

If no more identification signals are to be processed, then the tag reader optionally causes the set data to be saved (step 912). The set data can be saved in the tag reader itself. The tag reader can also transmit the set data to one or more tags in the set of tags associated with the items in the set of items, whereupon the one or more tags save the set data in the one or more tags. The tag reader can also transmit and cause to be saved the set data into a description pair server, a separate proxy tag, or any other form of volatile or non-volatile storage. When this part of the process is completed, the set creation is complete, and the set data can be used in subsequent set completeness inquiries.

The tag reader then can receive user input as to whether a determination should be made if the set of items is complete (step 913). Alternatively, the tag reader can automatically decide whether to determine if the set of items is complete. In either case, if the tag reader is to determine if the set of items is complete, then the process returns to step 900, flowing through steps 902, 904, and then steps 914 through 926 as described below. If the tag reader is not to determine if the set of items is complete at step 913, then the process terminates.

Returning to step 904, if no need exists to create set data, then the tag reader includes the item associated with the tag in a checked item set (step 914). A checked item set is a data structure that includes data that describes those tags, and hence those items, that have responded to the interrogate signal during a timeout period. The tag reader then determines whether more response signals are to be processed (step 916). If more response signals are to be processed, then the process returns to step 914 and repeats between steps 914 and 916 until all response signals to be processed have been processed.

If no more response signals are to be processed, then the tag reader compares the checked item set to the set data (step 918). The comparison can be executed to compare any information contained in the set data to corresponding information contained in the checked item data. At a minimum, the information is the identities of the items in the set of items.

Thus, for example, the tag reader determines whether the checked item set matches the set data (step 920). A checked item set matches the set data, in this example, if the identification of all items in the set data can be found in the checked item set. If the checked item set matches the set data, then the tag reader determines that the set is complete (step 922). The set is considered complete if all items in the set of items have been found within the interrogation zone. On the other hand, if the checked item set does not match the set data, then the tag reader determines that the set is incomplete (step 924).

In either event, the tag reader can optionally display a report (step 926). Alternatively, the tag reader can transmit a report to some other data processing system that can display, print, or otherwise process the report. The report can display that all items of the set are preset in the interrogation zone, assuming that the set is complete (step 922). The tag reader can display the identities of all items found, as well as corresponding descriptions of those items. The report can also display that all items of the set are not present in the interrogation zone, assuming that the set is incomplete (step 924). In this case, the tag reader can also display the identities of those items that were in the set data but not in the checked item set, as well as corresponding descriptions of those items. Additionally, the tag reader can display the identities of all items found in the checked item set, as well as corresponding descriptions of those items. However the report is configured or used, the process terminates thereafter.

Additionally, the tag reader can simultaneously track multiple sets of items within the same interrogation zone. In this case, the tag reader performs the process shown in FIG. 9 for each set at any given point in time. By using different wavelengths of radio signals, by using identification codes within the interrogate signal or signals, or by using identification codes within the corresponding response signals, or a combination thereof, a tag reader can track any number of sets of items within an interrogation zone. In this case, the tag reader can inform a user regarding sets of items found or sets of items not found, or both, using different audio or visual cues. For example, different tones can be used to indicate the presence or absence of items within a set. Different screens or different portions of a screen can be used to display information regarding multiple sets.

The methods and devices described herein have several advantages over known radio frequency identification systems. For example, the methods and devices described herein empower a user or manufacturer to create a set for a group of items, and later confirm the presence or absence of each item in the set within an interrogation zone. Additionally, the methods and devices described herein provide a means for alerting a user when an item in a set is removed from an interrogation zone.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of determining whether a set of items is complete, the method comprising:
   transmitting an interrogate signal from a tag reader into an interrogation zone containing a plurality of items, each of the plurality of items having a tag adapted to return a response signal;
   including each of the plurality of items, that return a response signal to the tag reader in response to the interrogate signal, in a checked item set;
   comparing the checked item set to a set data, wherein the set data identifies all items in a set of items, the set data is stored in at least one tag associated with at least one item in the set of items, and the set data is included in at least one response signal received at the tag reader; and
   determining whether the set of items is complete, wherein the set of items is complete when every item identified in the set data is included in the checked item set.

2. The method of claim 1 wherein the set data is pre-determined by a manufacturer.

3. The method of claim 1 further comprising:
   receiving, in response to the interrogate signal, a plurality of corresponding identification signals from each tag in a set of tags, wherein the plurality of corresponding identification signals are included in a plurality of corresponding response signals, and wherein each tag in the set of tags is associated with an item in the set of items on a one to one basis; and
   creating the set data by including in the set data all items for which the corresponding identification signal is received.

4. The method of claim 3 wherein the set data includes a first partial set data pre-determined by the manufacturer and wherein the method further comprises:
   creating a second partial set data by including in the second partial set data all items for which the corresponding identification signal is received; and creating the set data by combining the first partial set data and the second partial set data.

5. The method of claim 3 further comprising:
saving the set data in the tag reader.

6. The method of claim 5 wherein the response signal includes an identification code, and wherein the identification code is associated with a description of the item.

7. The method of claim 1 wherein each response signal includes a corresponding identification code and wherein the corresponding identification code is associated with a corresponding description of a corresponding item.

8. A computer program product comprising:
a computer usable medium having computer usable program code for determining whether a set of items is complete, said computer program product including:
computer usable program code for transmitting an interrogate signal from a tag reader into an interrogation zone containing a plurality of items, each of the plurality of items having an identification tag adapted to return a response signal;
computer usable program code for including each of the plurality of items, that return a response signal to the tag reader in response to the interrogate signal, in a checked item set;
computer usable program code for comparing the checked item set to a set data, wherein the set data identifies all items in a set of items, the set data is stored in at least one tag associated with at least one item in the set of items, and the set data is included in at least one response signal received at the tag reader; and
computer usable program code for determining whether the set of items is complete, wherein the set of items is complete when every item identified in the set data is included in the checked item set.

9. The computer program product of claim 8 wherein the set data is pre-determined by a manufacturer.

10. The computer program product of claim 8 further comprising:
computer usable program code for receiving, in response to the interrogate signal, corresponding identification signals from each tag in a set of tags, wherein the plurality of corresponding identification signals are included in a plurality of corresponding response signals, and wherein each tag in the set of tags is associated with an item in the set of items on a one to one basis; and
computer usable program code for creating the set data by including in the set data all items for which the corresponding identification signal is received.

11. The computer program product of claim 10 wherein the set data includes a first partial set data pre-determined by the manufacturer and wherein the computer program product further comprises:
computer usable program code for creating a second partial set data by including in the second partial set data all items for which the corresponding identification signal is received; and
computer usable program code for creating the set data by combining the first partial set data and the second partial set data.

12. The computer program product of claim 10 further comprising:
computer usable program code for saving the set data in the tag reader.

13. The computer program product of claim 12 wherein the response signal includes an identification code, and wherein the identification code is associated with a description of the item.

14. The computer program product of claim 8 wherein each response signal includes a corresponding identification code and wherein the corresponding identification code is associated with a corresponding description of a corresponding item.

15. A data processing system comprising:
a processor;
a bus connected to the processor;
a computer usable medium connected to the bus, wherein the computer usable medium contains a set of instructions for determining whether a set of items is complete, wherein the processor is adapted to carry out the set of instructions to:
transmit an interrogate signal from a tag reader into an interrogation zone containing a plurality of items, each of the plurality of items having an identification tag adapted to return a response signal;
include each of the plurality of items, that return a response signal to the tag reader in response to the interrogate signal, in a checked item set;
compare the checked item set to a set data, wherein the set data identifies all items in a set of items, the set data is stored in at least one tag associated with at least one item in the set of items, and the set data is included in at least one response signal received at the tag reader; and
determine whether the set of items is complete, wherein the set of items is complete when every item identified in the set data is included in the checked item set.

16. The data processing system of claim 15 wherein the set data is pre-determined by a manufacturer.

17. The data processing system of claim 15 wherein the processor is further adapted to carry out the set of instructions to:
receive, in response to the interrogate signal, a plurality of corresponding identification signals from each tag in a set of tags, wherein the plurality of corresponding identification signals are included in a plurality of corresponding response signals, and wherein each tag in the set of tags is associated with an item in the set of items on a one to one basis; and
create the set data by including in the set data all items for which the corresponding identification signal is received.

18. The data processing system of claim 17 wherein the set data includes a first partial set data pre-determined by the manufacturer and wherein the processor is further adapted to carry out the set of instructions to:
create a second partial set data by including in the second partial set data all items for which the corresponding identification signal is received; and
create the set data by combining the first partial set data and the second partial set data.

19. The data processing system of claim 17 wherein the processor is further adapted to carry out the set of instructions to:
save the set data in the tag reader.

20. The data processing system of claim 19 wherein the response signal includes an identification code, and wherein the identification code is associated with a description of the item.

* * * * *

UNITED STATES PATENT AND TRADEMARK OFFICE
CERTIFICATE OF CORRECTION

PATENT NO. : 7,605,705 B2  Page 1 of 1
APPLICATION NO. : 11/466174
DATED : October 20, 2009
INVENTOR(S) : Kritt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 431 days.

Signed and Sealed this

Fifth Day of October, 2010

David J. Kappos
*Director of the United States Patent and Trademark Office*